INVENTORS:
JEAN CLAUDE HONDERMARCK
JACQUES GUILLO
IAN CAMERON BENNETT
By Morgan, Finnegan, Durham & Pine
Their Attorneys

United States Patent Office 3,705,082
Patented Dec. 5, 1972

3,705,082
CULTIVATION AND RECOVERY OF MICRO-ORGANISMS
Jean Claude Hondermarck, Lavera, France, Ian Cameron Bennett, Pinner, England, and Jacques Guillo, Lavera, France, assignors to The British Petroleum Company Limited, London, England
Filed Oct. 16, 1969, Ser. No. 867,019
Claims priority, application Great Britain, Oct. 18, 1968, 49,546/68
Int. Cl. C12b 1/00
U.S. Cl. 195—28 R
1 Claim

ABSTRACT OF THE DISCLOSURE

A method and apparatus for the cultivation of micro-organisms wherein the pumping efficiency of cultivated broth removed from the cultivation zone is improved by first subjecting the removed cultivated broth to a separation step wherein aerated broth is separated from partially de-aerated broth under the action of the density differential between aerated broth and partially de-aerated broth, and thereafter pumping partially de-aerated broth back to the cultivation zone. The process is particularly suited to fermentations having external heat exchange means and in which the cultivated broth is highly aerated.

---

Figure 1:
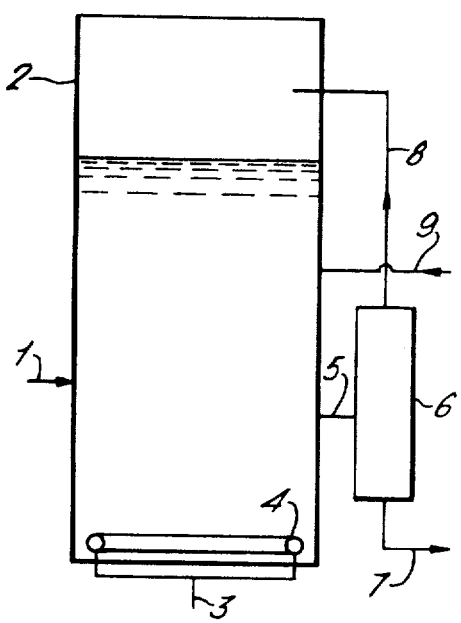

The present invention relates to an improved process and apparatus for the cultivation of micro-organisms. It is particularly concerned with the cultivation of micro-organisms on hydrocarbon substrates.

Processes for the cultivation of micro-organisms on hydrocarbon substrates require a high degree of agitation and aeration. Since the process is exothermic it is usual to provide some means for controlling the fermentation temperature. For example the aerated fermentation broth can be passed to a heat exchange unit where the broth temperature is suitably adjusted. The broth is then recycled back to the cultivation zone of the fermenter. Pumps are usually used to pass the broth to the heat exchanger and to recycle it. We have found that the highly aerated nature of the broth greatly reduces the pumping efficiency.

It is an object of the present invention to provide a process and apparatus for carrying out fermentations of the foregoing type where the broth is highly aerated, wherein the pumping efficiency is improved with a consequential lowering of capital and operating costs.

According to one aspect of the present invention there is provided a process for the cultivation of micro-organisms which comprises cultivating a hydrocarbon consuming strain of micro-organism in a cultivation zone in the presence of an aqueous medium, a hydrocarbon substrate and a free oxygen containing gas, removing broth from the cultivation zone and recycling broth back to the cultivation zone wherein broth removed from the cultivation zone passes to a quiescent zone wherein phase separation takes place, aerated broth moving upwardly in the quiescent zone and returning to the cultivation zone and partially deaerated broth being recovered from a low level in the quiescent zone and pumped back to the cultivation zone, upward flow of aerated broth in the quiescent zone taking place under the action of the density differential between aerated broth and partially deaerated broth.

The process can be employed for either batch or continuous fermentations.

Most suitably in order to obtain the desired temperature control in the fermenter the partially de-aerated broth recovered from the quiescent zone is treated in a heat exchange unit wherein its temperature is suitably adjusted prior to recycle back to the cultivation zone.

According to another aspect of the invention there is provided apparatus for the aerobic cultivation of a micro-organism wherein provision is made for the recycle of partially de-aerated broth said apparatus comprising a fermenter and a decanting vessel, said fermenter and decanting vessel being in fluid flow connection by transfer pipes at two levels, one level being above the other such that in use a flow pattern is created whereby broth passes from the fermenter by the lower pipe to the decanter and an aerated broth returns to the fermenter by the upper pipe, the decanting vessel being provided with means for take-off of partially de-aerated broth, the off-take for partially de-aerated broth being situated at a level below that at which the lower transfer pipe communicates with the decanter.

According to another aspect of the invention there is provided apparatus for the aerobic cultivation of a micro-organism wherein provision is made for recycle of partially deaerated broth said apparatus comprising a fermenter which defines a cultivation zone, the fermenter having located therein a decanter which defines a quiescent zone, said fermenter and said decanter being in fluid flow connection such that in use a flow pattern is created whereby broth passes from the cultivation zone of the fermenter to the quiescent zone of the decanter where phase separation takes place, aerated broth moving upwardly and returning to the cultivation zone and partially de-aerated broth being recovered from a low level in the quiescent zone by an off take in the decanter.

According to another aspect of the invention there is provided apparatus for the aerobic cultivation of a micro-organism wherein provision is made for recycle of partially de-aerated broth, said apparatus comprising a vertical cylindrical vessel having a co-axial director tube whereby, in use, in a cultivation zone circulation of broth takes place in the opposite direction within the tube, said vessel being provided with partitions in (or in and below) the annular space to isolate a sector of the annular space from the remaining annular space, said sector constituting a quiescent zone, said quiescent zone being connected, for purposes of liquid flow, at an intermediate level in said quiescent zone with the cultivation zone, said quiescent zone being connected for purposes of recirculation of aerated broth at a high level in said zone with a high level in the cultivation zone and said quiescent zone having an off-take for removal of partially de-aerated broth, said off-take being at a level in said quiescent zone below the level at which broth is fed to the quiescent zone.

Usually some or all of the partitions will be vertical partitions.

According to another aspect of the present invention there is provided an apparatus for the aerobic cultivation of a micro-organism wherein provision is made for recycle of partially de-aerated broth, said apparatus comprising a cylindrical fermenter vessel having a co-axial central tapering tube rising from the base of the fermenter vessel, said tube and said vessel base defining an open topped central sector having its largest diameter at the base of the vessel, said central sector constituting a quiescent zone, said central tube defining externally with the walls of the fermenter vessel a sector which constitutes a cultivation zone, said central quiescent zone and said cultivation zone being in liquid flow communication through the open top of the central tube, said central sector having an off-take at its base for the removal of partially de-aerated broth.

Preferably the fermentation vessel has an open ended co-axial director tube located in the cultivation zone, said director tube dividing the cultivation zone into an outer and inner annular space, whereby in use circulation of broth in the cultivation zone takes place in an opposite direction in the inner annular space to the direction of flow in the outer annular space.

Most suitably the foregoing apparatus are provided with a heat exchange unit through which the partially de-aerated broth from the queiscent zone is passed before returning it to the cultivation zone.

According to another aspect of the invention there is provided a process which comprises continuously cultivating a micro-organism in the presence of an aqueous nutrient medium, a hydrocarbon substrate and a free oxygen-containing gas, said micro-organism being a strain which consumes said hydrocarbon, and recovering at least partially de-aerated broth, cultivation of micro-organism and recovery of de-aerated broth being carried out in apparatus as hereinbefore described.

Preferably the hydrocarbon substrate used in accordance with any aspect of the invention hereinbefore described consists at least in part of a straight chain hydrocarbon.

Usually the straight-chain hydrocarbons will be present in the feedstock as paraffins; however, the straight chain hydrocarbons may be present as olefins; also there may be used a mixture containing straight chain paraffins and olefins.

Suitable feedstocks to the process of the invention include kerosine, gas oils and lubricating oils; these feedstocks may be unrefined or may have undergone some refinery treatment, but must contain a proportion of straight chain hydrocarbons in order to fulfil the purpose of this invention. Suitably the petroleum fraction will contain 3–45% by weight of straight chain hydrocarbons.

The process of the invention is of particular value for the treatment of petroleum gas oil fractions which contain straight chain hydrocarbons in the form of waxes, since by the process a gas oil of improved pour point can be obtained while the waxes are converted to a valuable product.

Micro-organisms which are cultivated as herein described may be yeasts, moulds, or bacteria. Within the term "micro-organism" used herein we include mixtures of micro-organisms.

Preferably when a yeast is employed this is of the family Cryptococcaceae and particularly of the subfamily Cryptococcoideae however, if desired there may be used, for example, ascosporogeneous yeasts of the subfamily Saccharomycoideae. Preferred genera of the Cryptococcoideae family are Torulopsis (also known as Torula) and Candida. Preferred strains of yeast are as follows.

In particular it is preferred to use the specific stock of indicated reference number; these reference numbers refer to CBS stock held by the Centraal Bureau voor Schimmelcultures, Baarn, Holland; to CMI stock held by the Commonwealth Mycological Institute, Kew, England; and NCYC stock held by the National Collection of Yeast Cultures, Nutfield, England.

| Specie: | Preferred strain |
|---|---|
| Candida brumptii. | |
| Candida catenulata. | |
| Candida clausenii. | |
| Candida humicola. | |
| Candida intermedia. | |
| Candida krusei. | |
| Candida lipolytica | CBS No. 2078, No. 599; CMI No. 93743; NCYC No. 376; No. 153. |
| Candida melibiosi. | |
| Candida parapsilosis | CMI No. 83350; NCYC No. 458. |
| Candida pulcherrima. | |
| Candida rugosa. | |
| Candida stellatoidea. | |
| Candida tropicalis | NCYC No. 4. |
| Candida utilis | CMI No. 2331. |
| Debaryomyces kloeckeri. | |
| Hansenula anomala. | |
| Pichia guilliermondii | CBS No. 2084; No. 2031. |
| Rhodotorula glutinis. | |
| Torulopsis famata. | |
| Torulopsis magnoliae. | |

Of the above Candida lipolytica and C. tropicalis are particularly preferred.

If desired the micro-organism may be a mould. Suitable moulds are of the family Moniliaceae; a suitable genus is Penicillium and preferably there is used Penicillium expansum. Another suitable genus is Aspergillus.

If desired the micro-organism may be a bacterium. Suitably the bacteria are of one of the orders. Pseudomonadales, Eubacteriales and Actinomycetales.

Preferably the bacteria which are employed are of the families Corynebacteriaceae, Micrococcaceae, Achromobacteraceae, Actinomycetaceae, Rhizobiaceae, Bacillaceae and Pseudomonadaceae. Preferred species are Bacillus megaterium, Bacillus substilis and Pseudomonas aeruginosa. Other species which may be employed include:

Achromobacter sp.
Brevibacyerium sp.
Corynebacterium sp.
Flavobacterium sp.
Micrococcus sp.
Pseudomonas sp.
Mycobacterium smegmatis
Mycobacteriaum sp.
Nocardia erythropolis
Nocardia minima
Nocardia opaca
Nocardia polychromogenes
Nocardia rubra
Nocardia rubropertinota
Streptomyces griseolus
Streptomyces rimosus
Streptomyces sp.

A suitable nutrient medium for yeasts and moulds has the composition:

|  | Grams |
|---|---|
| Diammonium phosphate | 20 |
| Potassium chloride | 11.5 |
| Magnesium sulphate 7H$_2$O | 6.5 |
| Zinc sulphate | 1.7 |
| Manganese sulphate 1H$_2$O | 0.45 |
| Ferrous sulphate 7H$_2$O | 0.68 |
| Tap water | 200 |
| Distilled water (to make up to 1000 mls). | |

Preferably therefore the aqueous nutrient medium is maintained at a desired pH by the step-wise or continuous addition of an aqueous medium of high pH value. Usually, when using moulds or yeasts and in particular when using Candida lipolytica, the pH of the nutrient medium will be maintained in the range 3–6 and preferably in the range 4–5. (Bacteria require a higher pH usually 6.5–8). Suitable alkaline materials for addition to the growth mixture include sodium hydroxide, potassium hydroxide, disodium hydrogen phosphate and ammonia, either free or in aqueous solution.

The optimum temperature of the growth mixture will vary according to the type of micro-organism employed and will usually lie in the range 25–35° C. When using Candida lipolytica the preferred temperature range is 28–32° C.

The take-up of oxygen is essential for the growth of the microorganism. The oxygen will usually be provided an air. In order to maintain a rapid rate of growth, the air used to provide oxygen, should be present in the form of fine bubbles under the action of stirring. The air may be introduced through a sintered surface. However there may be used the system of intimate aeration known as "vertex aeration."

The product from the fermenter is preferably decanted under conditions such that a major proportion of the aqueous nutrient medium is removed.

Preferably the fraction containing the micro-organism is subjected to treatment with an aqueous treating medium containing a surface active agent.

Preferably the micro-organism fraction is vigorously mixed with the aqueous surface-active agent, and, without a further period of growth of the micro-organism, is subjected to further separation, preferably by centrifuging, to recover a micro-organism fraction and a spent aqueous phase containing hydrocarbon impurities removed from the micro-organism. If necessary, the washing and separating steps may be repeated, once or more, using an aqueous surface-active agent in the washing stage. After washing with surface-active agent it is optional to wash with an aqueous medium which is free of surface active agent; preferably this medium will be water. Again if desired, a series of washing and separation stages may be employed. Preferably the washing stages are carried out until the hydrocarbon content of the micro-organism is less that 7% based on the weight of the micro-organism (as calculated for the dry state). Preferably said content of hydrocarbons will be less than 5%.

As the surface active agent employed for washing there may be used cationic surface-active agents such as stearyl-trimethyl ammonium chloride, non-ionic surface-active agents, for example the condensates of oleic acid and ethylene oxide, or anionic surface-active agents, for example sodium alkyl sulphates.

Preferably the recovered fraction containing the micro-organism, or dried micro-organism obtained therefrom, is subjected to solvent extraction for the removal of traces of hydrocarbon.

The present invention is further illustrated with reference to the following apparatus.

FIG. 1 shows a sketch of a fermentation apparatus having an external decanter 6 which forms a quiescent zone. The apparatus comprises a fermentation vessel 2 having a diameter of 1.8 meters and a height of 10 meters. The volume of the cultivation zone in this vessel is about 13.5 cu. meters. The vessel can be fed with growth medium through pipe 1. A ring sparge 4 for aeration is provided at the base of the cultivation zone. The sparge is fed with air through manifold 3. Fermentation vessel 2 is connected to the decanter 6 by a lower pipe 5 through which cultivated broth can be passed to the quiescent zone, and by an upper pipe 8 through which aerated broth can be passed back to the cultivation zone. Partially de-aerated broth can be removed from the base of the quiescent zone by an off take pipe 7 through which the broth can be passed to a heat exchange unit (not shown) and then recycled back to the fermentation vessel through pipe 9.

In operation of this apparatus a growth medium comprising a hydrocarbon, and an aqueous solution of mineral salts and traces of other essential nutrients was continuously passed through pipe 1 to the cultivation zone of fermentation vessel 2. The mixture was aerated at 1000 cu. meters of air per hour to give a cultivated broth having a density of 670 kilograms per cu. meter. The cultivated broth was passed at the rate of 18.35 cu. meters per hour through pipe 5 to the quiescent zone of decanter 6 where the broth separated under the action of the density differential between aerated broth and partially de-aerated broth into an upper phase of aerated broth having a density of 360 kilograms per cu. meter and a lower phase of partially de-aerated broth having a density of 850 kilograms per cu. meter. The partially de-aerated broth was removed from the base of the quiescent zone through off-take pipe 7 at the rate of 14.5 cu. meters per hour and pumped to a heat exchange unit where it was cooled and then recycled back to the fermenter. The aerated broth passed back to the fermenter from the top of the quiescent zone through pipe 8 at the rate of 3.85 cu. meters per hour.

Figure 2:
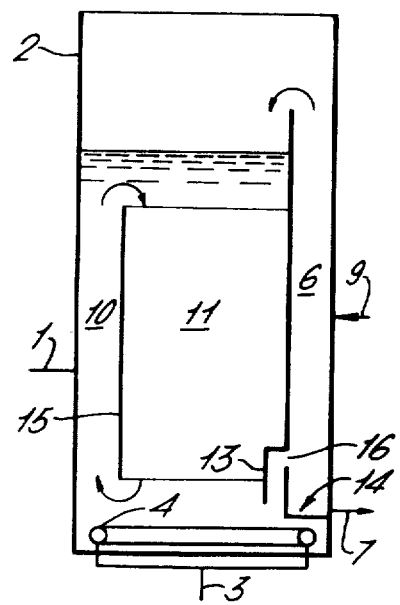
Figure 3:
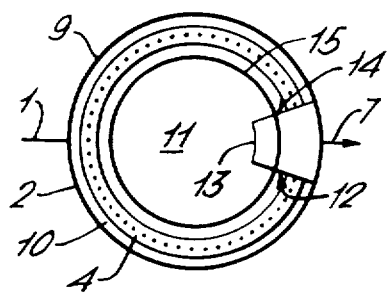

FIG. 2 shows a sketch of a fermentation apparatus having an internal decanter 6 and FIG. 3 is a plan view of the same apparatus. The apparatus comprises a vertical cylindrical fermentation vessel 2 having a co-axial director tube 15 whereby in use in a cultivation zone 10 and 11, circulation of broth takes place in the opposite direction in the space 11 within the tube to the direction of flow in the annular space 10 outside the tube. The vessel can be fed with growth medium through a feed pipe 1.

A ring sparge 4 for aeration is provided at the base of the cultivation zone. The sparge is fed with air through manifold 3. The vessel is provided with partitions 12 and 13 in the annular space 10 of the cultivation zone to isolate a sector of this annular space which forms a decanter 6 which provides a quiescent zone. The base of decanter 6 is formed by a horizontal partition 14. There is an aperture 16 at an intermediate level in the decanter 6 which allows cultivated broth to pass from the cultivation zone into the quiescent zone. The aperture is protected by a baffle 13. Partially de-aerated broth may be withdrawn from the base of the quiescent zone through off take pipe 7, pumped to a heat exchange unit not shown and recycled back to the cultivation zone of vessel 2 through pipe 9. Aerated broth passes back to the cultivation zone by overflowing from the top of the decanter 6.

In operation of the apparatus circulation of the broth in the cultivation zone causes cultivated broth to pass through aperture 16 into the quiescent zone of decanter 6, where the broth undergoes a phase separation under the action of the density differential between aerated and partially de-aerated broth. The partially de-aerated broth is withdrawn from the base of the zone and recycled via a heat exchange unit back to the cultivation zone. The aerated broth overflows from the top of the decanter to pass back to the cultivation zone.

Figure 4:
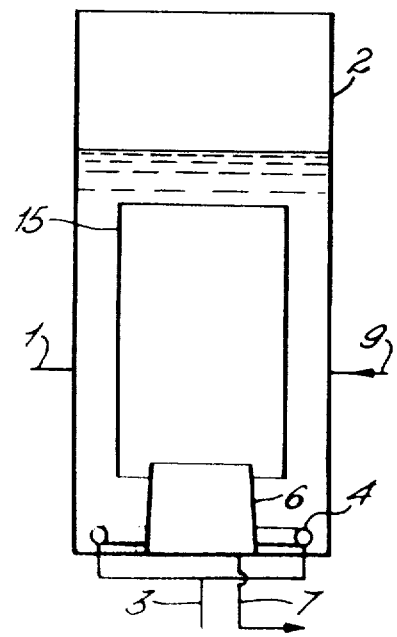

FIG. 4 shows a sketch of a further type fermentation apparatus having an internal decanter 6 which provides the quiescent zone. The apparatus comprises a fermentation vessel 2 having a diameter of 1.8 meters and a height of 10 meters. The vessel has a central co-axial open topped tube rising from its base. This tube forms a decanter 6. It defines a truncated conical sector 1 meter high, having a diameter of 0.8 meter at its base and a diameter of 0.67 meter at its top. This sector forms a quiescent zone when the apparatus is in use, wherein aerated broth passes upwards and partially de-aerated broth is removed from the base through an off take pipe 7. This de-aerated broth is pumped to a heat exchange unit (not shown) and then recycled back to the cultivation zone. The vessel has an open ended co-axial director tube 15 having a diameter of 1.3 meters, and a height of 5 meters. This tube is located in the cultivation zone at a height of 1 meter above the base of the fermentation vessel. The vessel is provided with a ring sparge 4 for aeration. The ring sparge is fed with air through manifold 3.

In operation of the apparatus nutrient medium was continuously passed into the cultivation zone through pipe 1 to give a level of 5 meters before aeration. The medium comprises a hydrocarbon and an aqueous solution of nutrient salts together with small quantities of other essential metabolites. The medium was aerated with 1000 cubic meters of air per hour, to give a cultivated broth having an average density of 670 kilograms per cubic meter. 5.22 cubic meters per hour of this cultivated broth passes into the quiescent zone through the open top of decanter 6 and a partially de-aerated broth having a density of 875 kilograms per cu. meter was withdrawn at the rate of 4 cubic meters per hour from the base of the zone through off take pipe 7. This de-aerated broth was pumped through a heat exchanger and recycled back to the cultivation zone through pipe 9. Aerated broth moves upwards in the quiescent zone and passes back into the cultivation zone through the open top of the decanter.

What we claim is:

1. A process for the cultivation of micro-organisms which comprises cultivating a hydrocarbon consuming strain of a micro-organism in a cultivation zone in the presence of an aqueous medium, a hydrocarbon substrate and a free oxygen containing gas, removing broth from the cultivation zone and recycling broth back to the cultivation zone, wherein broth removed from the cultivation zone passes to a quiescent zone wherein phase separation takes place, aerated broth moving upwardly in the quiescent zone and returning to the cultivation zone and partially de-aerated broth being recovered from a low level in the quiescent zone pumped through a heat exchange unit, wherein its temperature is suitably adjusted, and recycled back to the cultivation zone, upward flow of aerated broth in the quiescent zone taking place under the action of the density differential between aerated broth and partially de-aerated broth.

References Cited
UNITED STATES PATENTS 2,594,675  4/1952  Norell.

JOSEPH M. GOLIAN, Primary Examiner

U.S. Cl. X.R.

195—134, 142, 107